United States Patent [19]

Phillips

[11] 4,126,326
[45] Nov. 21, 1978

[54] TRAINING ROLL-ON BALL WITH BALANCING SUPPORTS

[76] Inventor: Marjorie E. Phillips, 7128 Haverford Dr., Dallas, Tex. 75214

[21] Appl. No.: 723,544

[22] Filed: Sep. 15, 1976

[51] Int. Cl.² .......................... B62K 1/00; B62K 9/00
[52] U.S. Cl. .................................... 280/205; 280/220; 280/87.04 R; 272/69
[58] Field of Search ................ 280/205, 206, 87.04 R, 280/87.04 A, 87.01, 220, 211; 272/114, 1 R, 69, 70, 70.3, 70.4, 73

[56] References Cited

U.S. PATENT DOCUMENTS

| | | | |
|---|---|---|---|
| 1,594,479 | 8/1926 | Swofford | 272/114 X |
| 2,402,330 | 6/1946 | Janosko | 272/70.4 |
| 3,306,626 | 2/1967 | Kawada | 280/205 |
| 3,379,437 | 4/1968 | Warner | 272/69 X |
| 3,512,798 | 5/1970 | Siegel | 280/205 X |
| 3,604,726 | 9/1971 | Tracy | 280/205 |
| 3,833,215 | 9/1974 | Isdith | 280/87.04 R X |
| 3,862,768 | 1/1975 | England | 280/205 |

FOREIGN PATENT DOCUMENTS 341,625 10/1921 Fed. Rep. of Germany .......... 280/220

Primary Examiner—Kenneth H. Betts
Attorney, Agent, or Firm—Hubbard, Thurman, Turner, Tucker & Glaser

[57] ABSTRACT

This invention is a device to aid persons of varying ages to balance and move freely on a ball. The ball is set in a framework in such a manner that it may roll freely. The framework is mounted on casters so that said framework may move freely with the ball. In use, the rider moves about atop the ball, using the handles of the framework for support when necessary for balance. As the user gains skill, the framework may be dispensed with.

2 Claims, 9 Drawing Figures

TRAINING ROLL-ON BALL WITH BALANCING SUPPORTS

SUMMARY OF THE INVENTION

This invention relates to a ball on which a person may master a feat usually undertaken by professional circus performers, that is, to balance and move freely in any direction on top of a large ball by taking steps in the opposite direction from which the ball is rolling to gain acceleration or by stepping in the same direction in which the ball is rolling to slow or to stop the movement of the ball. Balancing atop the rolling ball may be accomplished by practice and in complete safety with the aid of the training device, consisting of a ring which holds the ball. Said ring is supported by four legs or standards. There is a caster journaled to the lower end of each standard to support the attachment from the ground. Also, there are two upright handles attached to the ring. Tops of the two handles are at a height and distance from each other that enable the rider to grasp them with arms outstretched in a natural balancing position.

This invention enables a person to enjoy a new diversion on a vehicle which is novel in appearance and in performance. Skill in manipulating the device as disclosed herein includes balancing on the ball while stepping and turning with agility in any horizontal direction. The rider's balance is aided by the completely symmetrical design and perfect balance of the vehicle itself. In addition to training the user to balance on a ball, the invention can be used for purposes of fun, sport, a means of developing poise, rhythm, muscular coordination and strength and a pleasant way to reduce and exercise in a relatively small space...plus the satisfaction of accomplishing a new skill. Other objects are that the invention consists of a minimum of simple parts, making it convient to assemble, pack and ship — and its strength and light weight add to its safety and its ease in operation and maintenance.

DESCRIPTION OF VIEWS OF THE DRAWINGS

Other advantages will become apparent in the following specifications of the attached drawings in which.

DETAILED DESCRIPTION OF THE VIEWS OF THE DRAWINGS

Figure 1:
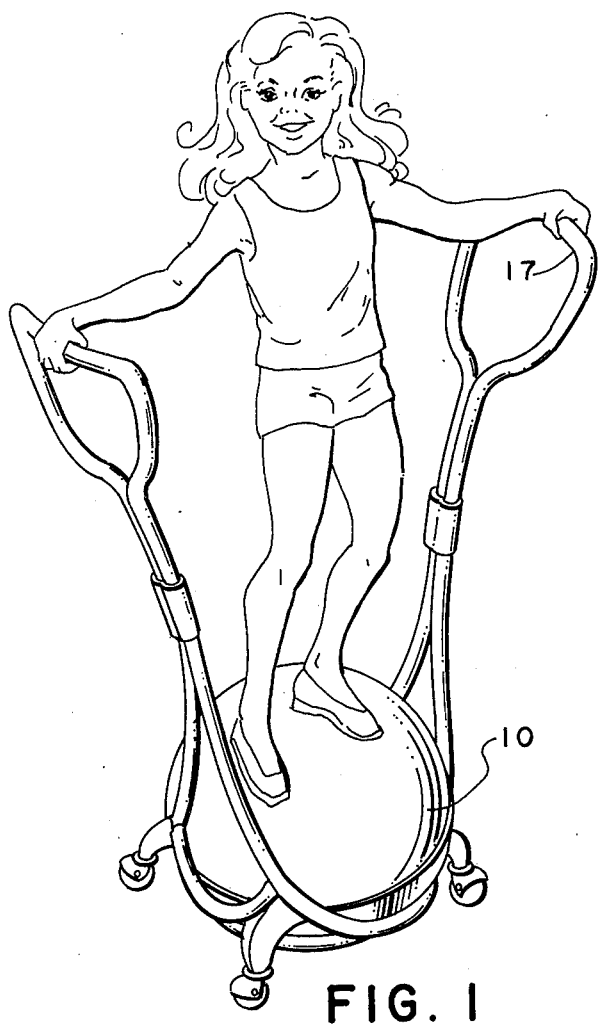
FIG. 1 is a perspective view of the invention in use.

Referring now to the drawings in detail wherein like reference numbers depict like parts throughout the several figures. The invention includes a strong, rigid, light-weight composition ball 10, large enough to make the mastery of balancing on the ball a challenge. Also, size of ball 10 enables rider to jump off without danger of coming in contact with supporting ring 11 or with standards 13. The ring 11 may be a curved collar-like shape or tubular in construction. On the inner side of ring 11 there are bearings 12 placed at intervals and at an angle to permit ball 10 to roll freely.

Figure 5:
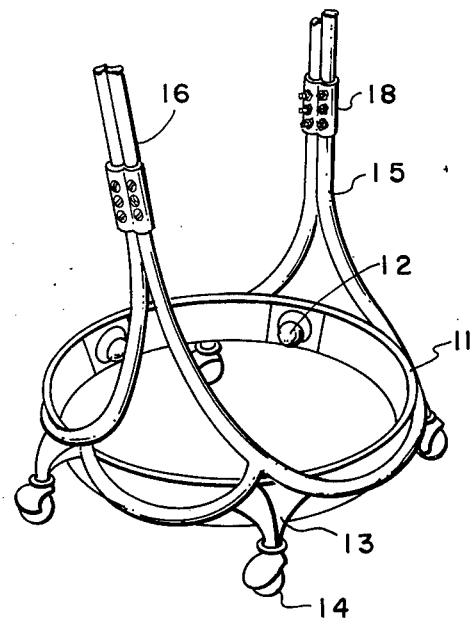
FIG. 5 is a perspective detail view of the embodiment of FIG. 1, with the ball removed, showing the ring to which other parts of the framework are connected.
Figure 9:
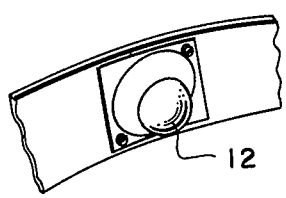
FIG. 9 is a detail of FIG. 5.

Features of preferred embodiments of the invention may be seen in each of the drawings, but they will be described mainly with reference to FIGS. 1, 5 and 9 which show the first embodiment.

Bearings 12 are made of a non-frictional material to further assure their efficiency. Ring 11 is supported from the ground by downwardly diverging legs or standards 13 firmly attached to ring 11. A swivel caster 14 is journaled to the lower end of each of the standards 13 for support and to keep the entire unit moving in the direction which the user wishes the ball 10 to roll. The frame also consists of upstanding posts 15 which are firmly attached to ring 11. Extension posts 16, telescopically mounted into posts 15 terminate at the top into handles 17. The telescopic mounting permits extension post 16 to be adjusted so as to vary the height of handle 17 above the ground. As particularly illustrated in FIG. 5, sleeves 18 connect posts 15 and 16, using adjustable fasteners such as the nuts and bolts shown. Where posts 15 and 16 are connected and reinforced by sleeve 18, there is a bend or flair which results in handles 17 being farther apart when handles 17 are extended in height, thereby conforming to the rider's arm height and arm span to assist in the rider's balance.

Figure 2:
FIG. 2 is a perspective view of a second embodiment of the invention.
Figure 4:
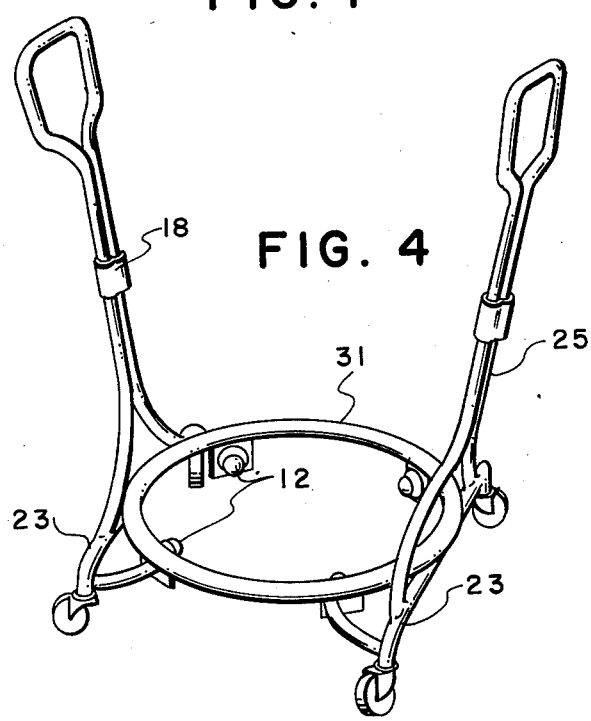
FIG. 4 is a perspective view of a third embodiment of the invention.
Figure 3:
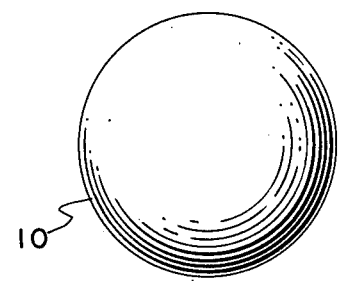
FIG. 3 illustrates the ball.
Figure 6:
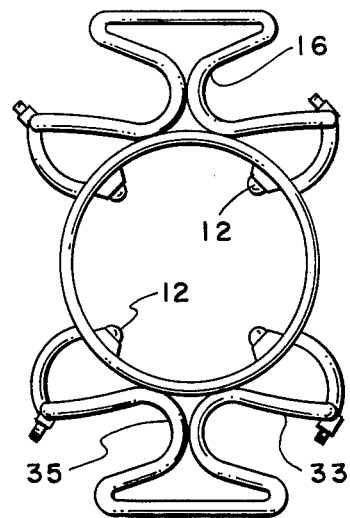
FIG. 6 is a top plan view of the framework in a fourth embodiment of the invention.
Figure 7:
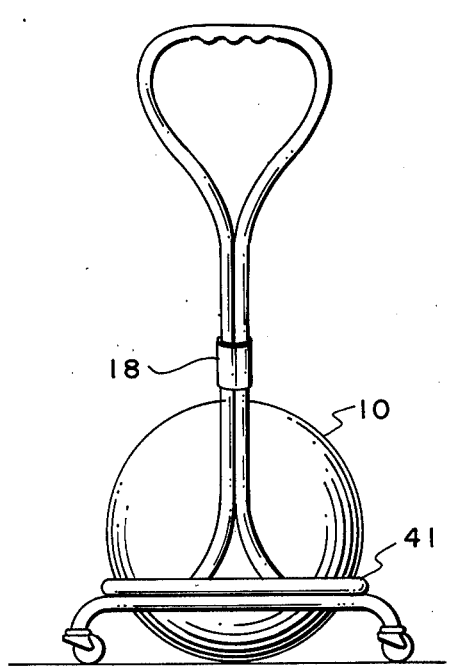
FIG. 7 illustrates the side elevation of a fifth embodiment of the invention.
Figure 8:
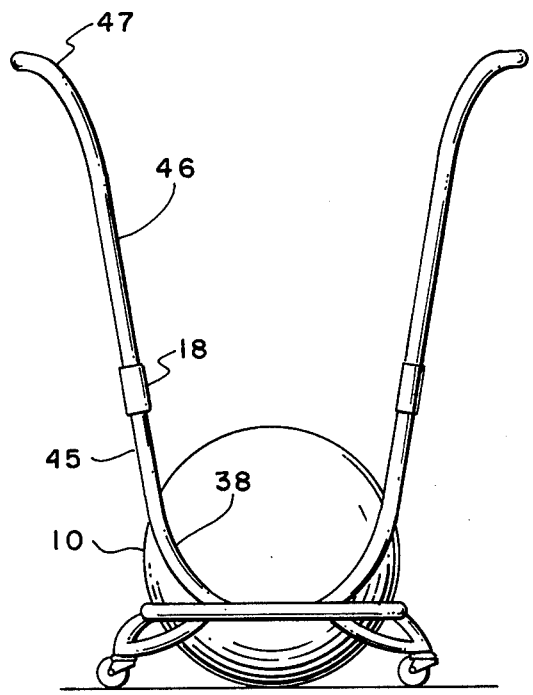
FIG. 8 illustrates the front elevation of a sixth embodiment of the invention.

FIG. 2 shows an embodiment employing a tubular ring 21 and wheel castors 24. In the embodiment of FIG. 4, posts 25 are connected to standards 23 instead of to ring 31 which is to hold ball 10. FIG. 4 additionally illustrates one way bearings 12 can be mounted on the tubular ring 31. In FIG. 6, part of standards 33 are formed as continuations of posts 35. FIG. 7 shows a tubular ring 41 holding ball 10. The embodiment of FIG. 8 illustrates that extension posts 46 can be made to flare outward from ball 10 at lower portions 38 of posts 45. Additionally, in FIG. 8, handles 47 are curved outward from extension posts 46.

Having thus described preferred embodiments of the invention, it should be understood that numerous structural modifications and adaptations may be resorted to without departing from the scope of the appended claims.

What is claimed is:

1. A training, playing and exercise device for use by a rider on a surface, comprising:
    a ball, and
    a frame, including,
        at least two upwardly extending members disposed to provide support for the rider, each one of said members flaring outward from the ball and including a handle and means for adjusting the length of said one member to the handle thereof, whereby increasing said length of said member increases the distance between the handles,
        means on the frame for permitting the frame to move in any direction along the surface in a low-friction manner while maintaining said members in the upward, supporting dispositions thereof, and
        means on the frame for holding the ball with an upper surface thereof exposed to be stood upon by the rider, including means for permitting the ball to rotate in a low-friction manner in any direction about the center thereof, and roll along the surface, said means for holding including a ring with a plurality of anti-friction bearings around the ring and disposed toward the interior thereof to engage the surface of the ball, whereby the rider may stand upon the ball, gaining support from said members, and roll the ball along the surface.

2. A training, playing and exercise device for use by a rider on a surface, comprising:

a ball, and a frame, including, at least two upwardly extending members disposed to provide support for the rider, each one of said members flaring outward and including a handle and means for adjusting the length of said one member to the handle thereof, whereby increasing said length of said member increases the distance between the handles, means on the frame for permitting the frame to move in any direction along the surface in a low-friction manner, while maintaining said members in the upward, supporting dispositions thereof, and means on the frame for holding the ball with an upper surface thereof exposed to be stood upon by the rider, including means for permitting the ball to rotate in a low-friction manner in any direction about the center thereof, and roll along the surface, whereby the rider may stand upon the ball, gaining support from said members, and roll the ball along the surface.

* * * * *